April 12, 1932. W. S. EATON 1,854,122
RADIO INSTRUMENT FOR DETERMINING ELEVATION
Filed March 16, 1929
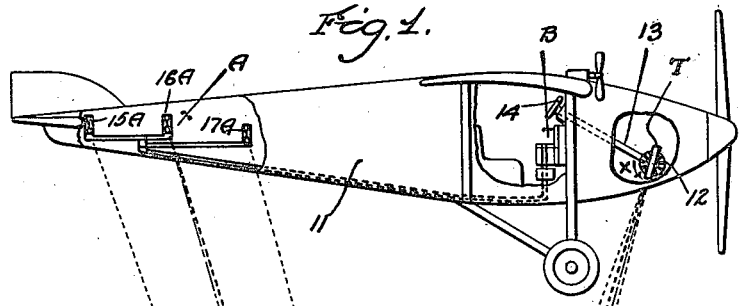
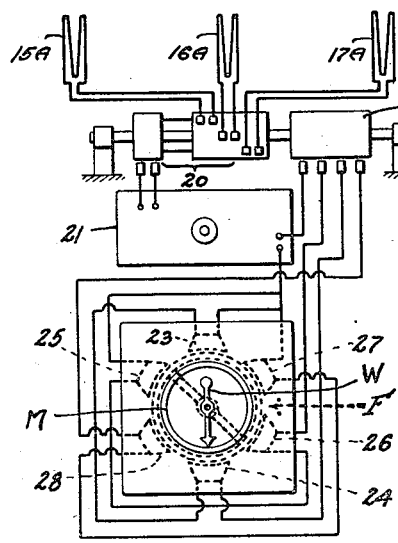
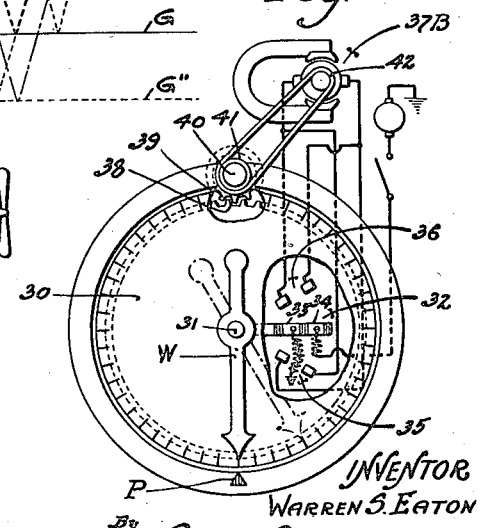
INVENTOR
Warren S. Eaton
By
ATTORNEY Patented Apr. 12, 1932

1,854,122

UNITED STATES PATENT OFFICE

WARREN S. EATON, OF LOS ANGELES, CALIFORNIA, ASSIGNOR, BY MESNE ASSIGNMENTS, TO EATON RADIO INSTRUMENT CORPORATION, OF LOS ANGELES, CALIFORNIA, A CORPORATION OF CALIFORNIA

RADIO INSTRUMENT FOR DETERMINING ELEVATION

Application filed March 16, 1929. Serial No. 347,715.

This invention embodies a radio compass unit similar to that disclosed in my copending application, Serial No. 348,031, filed on March 18, 1929, Patent No. 1,842,342, which is associated in combination with transmitting means and novel indicating means for the purpose of determining at any time the elevation of the unit above the ground surface.

It is well known that one difficulty experienced in the navigation of aircraft resides in the lack of accurate means for determining the exact elevation above the surface of the ground, for although barometers, altimeters, etc. give a relative indication of the altitude relative to sea level, and may be corrected to give elevation relative to the field from which an airplane started its flight, these instruments are of little value in determining the exact elevation above the ground surface irrespective of barometric or atmospheric pressure conditions.

It is an object of this invention to accurately indicate the exact elevation of the vehicle above the ground surface over which it is travelling.

It is a noteworthy feature of this invention that the operation of the unit may be made automatic so that the attention of the operator is not needed to make observations on elevation.

The details in the construction of a preferred form of the invention, together with further objects attending its production, will be better understood from the following description of the accompanying drawings, which are chosen for illustrative purposes only and in which:

Fig. 1 is an elevational view partly broken away, showing an airplane equipped with an embodiment of my invention and illustrating the principal upon which the invention operates.

Fig. 2 is a diagrammatic view illustrating a form of compass unit used in connection with the invention, and Fig. 3 is a face view partly broken away showing the construction of a dial and indicator, and illustrates diagrammatically automatic means for indicating elevation.

The principle upon which this invention operates is based upon the directional transmission of radio waves (from an airplane or other vehicle equipped with the invention) the reflection of the waves from the earth's surface and the reception of the waves in antennæ mounted on the vehicle carrying the transmitter.

It is well known to those familiar with the art that if a "beam" type of radio wave is directed toward a plane surface, the line in which this wave may be received with greatest intensity is along the angle of reflection of the "beam" relative to the plane surface. This principle is the same as for the reflection of light, the angle of incidence being equal to the angle of reflection.

It will be understood of course that there is a certain amount of "diffusion" in both the incident and reflected beam, so that the waves may be thought of as travelling in a band instead of a beam, but the signal of greatest intensity will in any event be found on the reflection line relative to the position of the directional transmitting antenna.

Assume now that three (or more) receiving antennæ arranged substantially equidistant relative to each other are placed in a reflected band of radio waves such as described above, with the middle antenna at the center of the band, it will be apparent that the current induced in the middle antenna will have the greatest intensity and the other two will receive induced currents which are proportionately less than that in the middle antenna, and are substantially equal to each other. If the three currents induced are led to an indicator of the class disclosed in my copending application above referred to, the indicator will be moved into substantial parallelism with the set of field pieces that are connected with the middle antenna.

As the distance from the reflecting surface to the transmitting and receiving units changes, the angle of the transmitting antenna may be changed to bring the center of the reflected band back to the middle antenna, such condition being shown by the indicator. The necessary movement of the transmitting antenna will be directly dependent upon the distance of the unit from the reflecting surface, and it is upon this principle that my invention operates.

Referring now to the drawings which have been chosen for the purpose of illustrating this invention, reference numeral 11 indicates an airplane which is provided with a directional transmitting means generally indicated at T, a unit of receiving antennæ generally indicated at A, and receiving and indicating means generally indicated by the reference character B.

The directional transmitting antenna T is provided with adjusting means illustrated as embodying a gear 12, a rotating shaft 13 and means such as a hand wheel or motor organization generally indicated at 14 for imparting angular adjustment to the antenna T through rotation of the shaft 13.

The unit of receiving antenna A is illustrated as consisting of three separate antennæ indicated at 15A, 16A and 17A, which are spaced equidistantly.

It will be understood as was pointed out above, that if a transmitted radio wave is directed from the antenna T along the course indicated in dotted lines in Fig. 1, that wave will have a maximum intensity along a line indicated by reference numeral 18 and that the projected or incident wave will be reflected from the surface of the ground indicated at G, the reflected wave of maximum intensity being indicated by reference numeral 18'.

It will also be apparent from the foregoing description that the current induced in the central antenna 16A will have a maximum value when the angle of incidence of the transmitted wave 18 is equal to the angle of reflection in wave 18', such angles being based upon the ground surface level G.

The intensities of the induced currents in antennæ 15A and 17A under the conditions described will be substantially equal and it will be understood that if the three induced currents from these antennæ are led through a suitable tuning and amplifying means which is associated with a suitable indicator, that the indicator will provide means for determining whether or not the transmitting wave is directed toward the earth at an angle which is equal to the angle of reflection relative to the central antenna 16A.

It will be understood that if the ground level is located at G', with respect to the airplane, the signal of maximum intensity will be carried along a line 18a and that if the ground level is located at G'' with respect to the airplane, the transmitting antenna remaining in the same angular position, the line of maximum intensity will be as indicated at 18b and the maximum current will be induced in the receiving antenna 15A, which will be indicated through the receiving and indicating means as will be hereinafter more fully pointed out.

Assuming the last conditions to be present, in which the reflecting surface is located at G'', it will be necessary in order to bring the maximum intensity of signal to the receiving antenna 16A to rotate the transmitting antenna in the direction of the arrow X in Fig. 1. This rotation will be effective to move the transmitting wave to the dot and dash line position shown in Fig. 1, which wave will be reflected from the ground surface G'' toward the center where it will be received by antenna 16A.

It will be apparent therefore from the foregoing description that when the angularity of the transmitting antenna T is adjusted, as described, and operatively connected with a suitably calibrated indicator, and the maximum signal is being received in the central receiving antenna 16A the position of the calibrated indicator will indicate the position of the apparatus or the vehicle carrying the apparatus with respect to the reflecting surface, which in the case of an airplane is the surface of the earth G.

Figs. 2 and 3 illustrate more or less diagrammatically a preferred form of receiving and indicating means. The system shown in Fig. 2 may be generally described as consisting of three receiving antennæ 15A, 16A, and 17A, which are connected through a suitable commutating means generally indicated at 20 with tuning and amplifying means generally indicated at 21. The tuning and amplifying means are associated with a field piece commutator 22 which is adapted to intermittently conduct a current through a plurality of field pieces generally indicated at F. The field pieces F are associated with a suitable rotor or flux carrying member M which carries an indicating needle or pointer, W. The field pieces F are arranged in sets as indicated by reference numerals 23, 24; 25, 26; and 27, 28 and the sets of field pieces are electrically connected in substantial parallelism with the respective receiving antennæ 16A, 15A and 17A. It is to be understood that the center field piece is connected with the center antennæ and the side field pieces are connected with the side antennæ.

For convenience in describing the operation of the indicator, the receiving antenna 15A will be considered as being connected with the field pieces 25 and 26, antenna 16A with field pieces 23 and 24 and antenna 17A with field pieces 27 and 28. It will be understood under the conditions illustrated in Fig. 1 that, when the induced current has maximum intensity in the antenna 16A and the currents induced in antennæ 15A and 17A are substantially equal to each other, the resultant force set up in the area surrounded by the field pieces will be substantially parallel with field pieces 23 and 24 and the indicator will be revolved into the position illustrated in Fig. 2. Likewise, as the maximum intensity is resolved into either of the antennæ 15A or 17A the indicator W will be moved to the right or left respectively. It will be therefore understood that the movement of the indicator to the right or left will advise the operator of an instrument of this character that it is necessary to rotate the transmitting antenna T in the corresponding direction until the pointer W is again in vertical position.

In order that the movement of the antenna T will be effective to automatically indicate the elevation of the apparatus relative to the reflecting surface, there is provided some means to rotate dial 30, and the transmitting antenna T in a manner such that the movement of the transmitting antenna will be effective to impart rotation to the dial and the dial being calibrated to read elevation, it will be apparent that the movement of the antenna will be effective to cooperate with the mentioned dial in providing means for indicating immediately the exact distance between the unit and the reflecting surface.

It will be understood that the movement of the antenna T may be carried out manually, such manual movement means being operatively connected with the dial 30 as heretofore mentioned, but it is considered preferable and was mentioned as a primary object of this invention to provide means which are automatically effective to move the antenna T to the correct position at which the signal of maximum intensity will be received in the receiving antenna 16A, such automatic means being also effective to operate the indicating dial 30.

Fig. 3 illustrates a preferred manner of arranging the indicating unit for the automatic operation mentioned above. In this figure the pointer or indicator W is illustrated as being mounted upon a shaft 31 which also carries a radially extending arm 32. The arm 32 has formed upon it contact surfaces indicated at 33 and 34 and fixed contact points generally indicated by reference numerals 35 and 36 are positioned on opposite sides of the movable contact arm 32.

The contact arm 32 and the contact points 35 and 36 provide two reversing switches for a motor, generally indicated by reference numeral 37B, and the motor 37B is connected in any suitable manner with the shaft 13 in Fig. 1 so that rotation of the motor is effective to impart angular adjustment to the antenna T.

The periphery of the dial 30 is provided with a gear indicated at 38 which is adapted to cooperate with a pinion 39 mounted on a shaft 40, and with a pulley 41 to receive rotation from the motor 37 through a suitable belt indicated by reference numeral 42. It will be understood from this illustration that when the indicator W is carried to the dot and dash line position shown in Fig. 3, that contact is made with the contact points 36, which will be effective to close a circuit between the motor 37B and to thereby rotate the transmitting antenna T to a position at which the maximum signal is again received in the receiving antenna 16A, thus bringing the indicator W back to the full line position shown in Fig. 3.

It will be understood however that the dial 30 is rotatable relative to the shaft 31 which carries the indicator W and that while the motor 37 moves the transmitting antenna T to a position referred to above, the dial 30 will be rotated to a point at which the exact elevation of the airplane may be read opposite the indicating point P, it being understood that the zero reading of the dial is opposite the point P at such times when the airplane is upon the surface of the ground only.

It will be apparent from the foregoing description that this invention embodies a unit which is effective to automatically indicate the exact elevaton of an airplane above the surface of the earth, irrespective of the altitude of the surface of the ground relative to sea level. By changing the position of the antennæ and the indicator, the apparatus may be employed, with equal facility, for determining the distance from a level point to a cliff. The apparatus may, therefore, be described more broadly as being adapted for use in determining the distance from a point to a wave reflecting surface, and although I have herein described and illustrated one preferred embodiment of the invention, it is to be understood that the invention is not limited to the precise construction set forth, but includes whatever changes fairly come within the scope of the appended claims.

I claim as my invention:

1. The herein described method of determining the distance to a reflecting surface, which comprises directionally transmitting electro-magnetic energy to a reflecting surface, receiving the reflected energy at a known distance from the source of transmission, and registering by said received energy the distance to the reflecting surface.

2. The herein described method of determining the distance to a reflecting surface, which comprises directionally transmitting electro-magnetic energy to a reflecting surface, receiving the reflected energy at a known distance from the source of transmission and in different amounts, and registering by said received energy the distance to the reflecting surface.

3. The herein described method of determining the distance to a reflecting surface, which comprises directionally transmitting electro-magnetic energy to a reflecting surface, receiving the reflected energy at a known distance from the source of transmission, generating by said received energy fields of force, and registering by said fields of force the distance to said reflecting surface.

4. The herein described method of determining the distance to a reflecting surface, which comprises directionally transmitting electro-magnetic energy, reflecting said energy, receiving the reflected energy at a known distance from the source of energy, generating by said received energy magnetic fields of force, and registering the distance to the point of reflection by the magnetic fields of force.

5. The herein described method of determining the distance to a reflecting surface, which comprises directionally transmitting electro-magnetic energy to a reflecting surface, angularly adjusting the directional transmission to receive the reflected energy at a known distance from the source of transmission, receiving the reflected energy at said known distance from the source of transmission, and registering by said received energy the distance to the reflecting surface.

6. The herein described method of determining the distance to a reflecting surface, which comprises directionally transmitting electro-magnetic energy to a reflecting surface, varying the distance from the source of energy to the reflecting surface, angularly adjusting the directional transmission to receive the reflected energy at a known distance from the source of transmission in accordance with change in distance to the reflecting surface, receiving the reflected energy at said known distance from the source of transmission, and registering by said received energy the distance to the reflecting surface.

7. The herein described method of determining the distance to a reflecting surface, which comprises directionally transmitting electro-magnetic energy to a reflecting surface, varying the distance from the source of energy to the reflecting surface, angularly adjusting the directional transmission by the received energy to receive the reflected energy at a known distance from the source of transmission in accordance with the change in distance to the reflecting surface, receiving the reflected energy at said known distance from the source of transmission, and registering by said received energy the distance to the reflecting surface.

8. An apparatus for determining distance therefrom to an electrodynamic reflecting surface embodying, a directional radio transmitter, receiving means having a known spacing from said transmitter and disposed to receive the transmitted energy when reflected from a reflecting surface, and means operatively connected with said receiving means for registering the distance from said reflecting surface to the apparatus.

9. In an apparatus for determining distance therefrom to an electrodynamic reflecting surface, a directional radio transmitter, receiving means having a known spacing from said transmitter to receive the transmitted energy in different amounts when reflected from a reflecting surface, and means operatively connected with said receiving means for generating fields of force in accordance with the different amounts of received energy.

10. An apparatus for determining distance therefrom to an electrodynamic reflecting surface embodying, a directional radio transmitter, receiving means having a known spacing from said transmitter to receive the transmitted energy in different amounts when reflected from a reflecting surface, means operatively connected with said receiving means for generating fields of force in accordance with the different amounts of received energy, a member rotatably mounted in and subject to the fields of force, and an indicator actuated by said rotatable member for indicating the distance.

11. An apparatus for determining distance therefrom to an electrodynamic reflecting surface embodying, a directional radio transmitter, receiving means having a known spacing from said transmitter to receive the transmitted energy in different amounts when reflected from a reflecting surface, means operatively connected with said receiving means for generating fields of force in accordance with the different amounts of received energy, a member rotatably mounted in and subject to the fields of force, a distance calibrated register card, and an index in cooperative relation with said card and actuated by said rotatable member to register the distance.

12. In an electrodynamic apparatus for determining the distance to an electrodynamic reflecting surface, a directional transmitting antenna for transmitting energy to a reflecting surface, and receiving antennæ spaced from said transmitting antenna for receiving the reflected transmitted energy, one of said antennæ being adjustable with respect to the other to cause the reflected energy to be received by the receiving antennæ.

13. In an electrodynamic apparatus for determining the distance to an electrodynamic reflecting surface, a directional transmitting antenna for transmitting energy to a reflecting surface, and receiving antennæ spaced from said transmitting antenna for receiving reflected transmitted energy, the transmitting antenna being adjustable to vary the directional transmission thereof to cause the reflected energy to be received by the receiving antennæ.

14. In an electrodynamic apparatus for determining the distance to an electrodynamic reflecting surface, a directional transmitting antenna for transmitting energy to a reflecting surface, receiving antennæ spaced from the transmitting antenna for receiving the reflected transmitted energy, and means for angularly adjusting the directional transmission to cause the reflected energy to be received by the receiving antennæ.

15. In an electrodynamic apparatus for determining the distance to an electrodynamic reflecting surface, a directional transmitting antenna for transmitting energy to a reflecting surface, receiving antennæ spaced from the transmitting antenna for receiving the reflected transmitted energy, one of said antennæ being movably mounted and means connected with the movably mounted antenna for adjusting the movable antenna upon its mounting to cause the reflected energy to be received by the receiving antennæ.

16. In an electrodynamic apparatus for determining the distance to an electrodynamic reflecting surface, a directional transmitting antenna for transmitting energy to a reflecting surface, receiving antennæ spaced from the transmitting antenna for receiving the reflected transmitted energy, and means actuated by the received energy for angularly adjusting the directional transmission to cause the reflected energy to be received by the receiving antennæ.

17. In an electrodynamic apparatus for determining the distance to an electrodynamic reflecting surface, a directional transmitting antenna for transmitting energy to a reflecting surface, receiving antennæ spaced from the transmitting antenna for receiving the reflected transmitted energy, and means actuated by the received energy for adjusting one of the antennæ to cause the reflected energy to be received by the receiving antennæ.

18. In an electrodynamic apparatus for determining the distance to an electrodynamic reflecting surface, a directional transmitting antenna for transmitting energy to a reflecting surface, receiving antennæ spaced from said transmitting antenna for receiving the transmitted energy reflected from said reflecting surface, means for resolving the received energy into fields of force, and means actuated by said fields of force for angularly adjusting the directional transmission to cause the reflected energy to be received by the receiving antennæ.

19. In an electrodynamic apparatus for determining the distance to an electrodynamic reflecting surface, a directional transmitting antenna for transmitting energy to a reflecting surface, receiving antennæ spaced from said transmitting antenna for receiving the transmitted energy reflected from said reflecting surface, means for resolving the received energy into fields of force, and means actuated by said fields of force for adjusting one of the antennæ to cause the reflected energy to be received by the receiving antennæ.

20. In an electrodynamic apparatus for determining the distance to an electrodynamic reflecting surface, a directional transmitting antenna for transmitting energy to a reflecting surface, receiving antennæ spaced from said transmitting antenna for receiving the reflected energy, a distance calibrated register card, an index in cooperative relation with said card, and means actuated by the received energy for operating the index with respect to the card and for adjusting the transmitting antenna to vary the angle of directional transmission so that the reflected energy will be received by the receiving antennæ.

21. In an electrodynamic apparatus for determining the distance to an electrodynamic reflecting surface, a directional transmitting antenna for transmitting energy to a reflecting surface, receiving antennæ spaced from said transmitting antenna for receiving the reflected energy, a distance calibrated register card, an index in cooperative relation with said card, and means actuated by the received energy for operating the index with respect to the card and for mutually adjusting the transmitting and receiving antennæ so that the reflected energy will be received by the receiving antennæ.

22. In an electrodynamic apparatus for determining the distance to an electrodynamic reflecting surface, a directional transmitting antenna for transmitting energy to a reflecting surface, receiving antennæ spaced from said transmitting antenna for receiving the energy reflected from said reflecting surface, a distance calibrated register, and means actuated by the received energy for operating the register and for adjusting the angle of directional transmission to reflect transmitted energy from the reflecting surface to the receiving antennæ.

23. In an electrodynamic apparatus for determining the distance to an electrodynamic reflecting surface, a directional transmitting antenna for transmitting energy to a reflecting surface, receiving antennæ spaced from said transmitting antenna for receiving the energy reflected from said reflecting surface, a distance calibrated register, and means actuated by the received energy for operating the register and for adjusting one of the antennæ to reflect transmitted energy from the reflecting surface to the receiving antennæ.

24. The herein described method of determining the distance to a reflecting surface which comprises directionally transmitting electro-magnetic energy, reflecting said energy, receiving the reflected energy at a known distance from the source of transmission by a relative adjustment of the transmission and reception of the energy, and registering by said received energy the distance to the reflecting surface.

25. An electrodynamic apparatus for determining the distance to an electrodynamic reflecting surface comprising a directional transmitting antenna for transmitting energy to a reflecting surface, receiving antennæ, means for adjusting the relation between the transmitting and receiving antennæ to receive on the receiving antennæ the energy transmitted by the transmitting antenna and reflected from the reflecting surface, and means actuated by the received energy for registering the distance to the reflecting surface.

26. An electrodynamic apparatus for determining the distance to an electrodynamic reflecting surface comprising a directional transmitting antenna for transmitting energy to a reflecting surface, receiving antennæ, means for adjusting the transmission and reception of the energy with respect to each other to receive on the receiving antennæ the energy reflected from the reflecting surface, and means actuated by the received energy for registering the distance to the reflecting surface.

27. An electrodynamic apparatus for determining the distance to an electrodynamic reflecting surface comprising a directional transmitting antenna, receiving antennæ having a known spacing from said transmitting antenna, means for adjusting the angle of directional transmission to reflect transmitted energy from a reflecting surface to the receiving antennæ, means for resolving the received energy into fields of force, a register calibrated to show the distance to the reflecting surface, and means for actuating the register by the fields of force to show the distance to the reflecting surface.

28. An electrodynamic apparatus for determining the distance to an electrodynamic reflecting surface comprising a directional transmitting antenna, receiving antennæ having a known spacing from said transmitting antenna, means for adjusting the angle of directional transmission to reflect transmitted energy from a reflecting surface to the receiving antennæ, the receiving antennæ being mutually disposed to receive the reflected energy in different amounts, means for resolving the received energy into fields of force, a register calibrated to show the distance to the reflecting surface, and means for actuating the register by the fields of force to show the distance to the reflecting surface.

In testimony whereof, I have hereunto set my hand at Los Angeles, California, this 5th day of March, 1929.

WARREN S. EATON.